June 26, 1934.   A. P. DIESCHER   1,964,508
TUBE HANDLING APPARATUS
Filed April 29, 1933   3 Sheets-Sheet 3
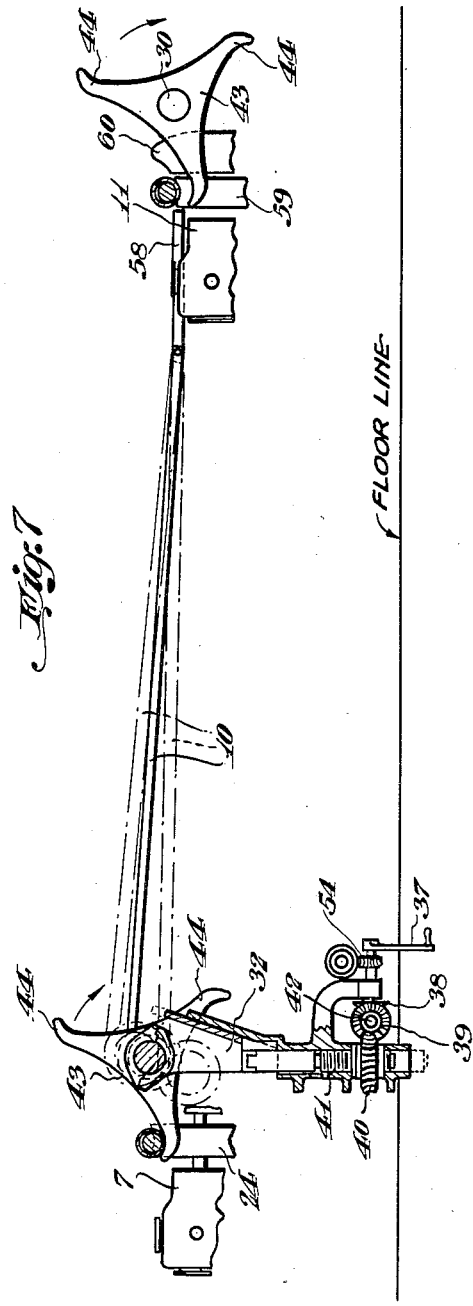
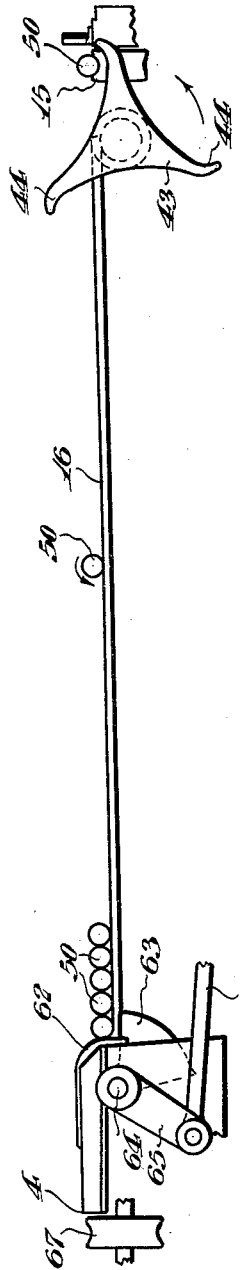
WITNESSES.
INVENTOR.
August P. Diescher.
BY
Brown, Critchlow & Flick
ATTORNEYS.

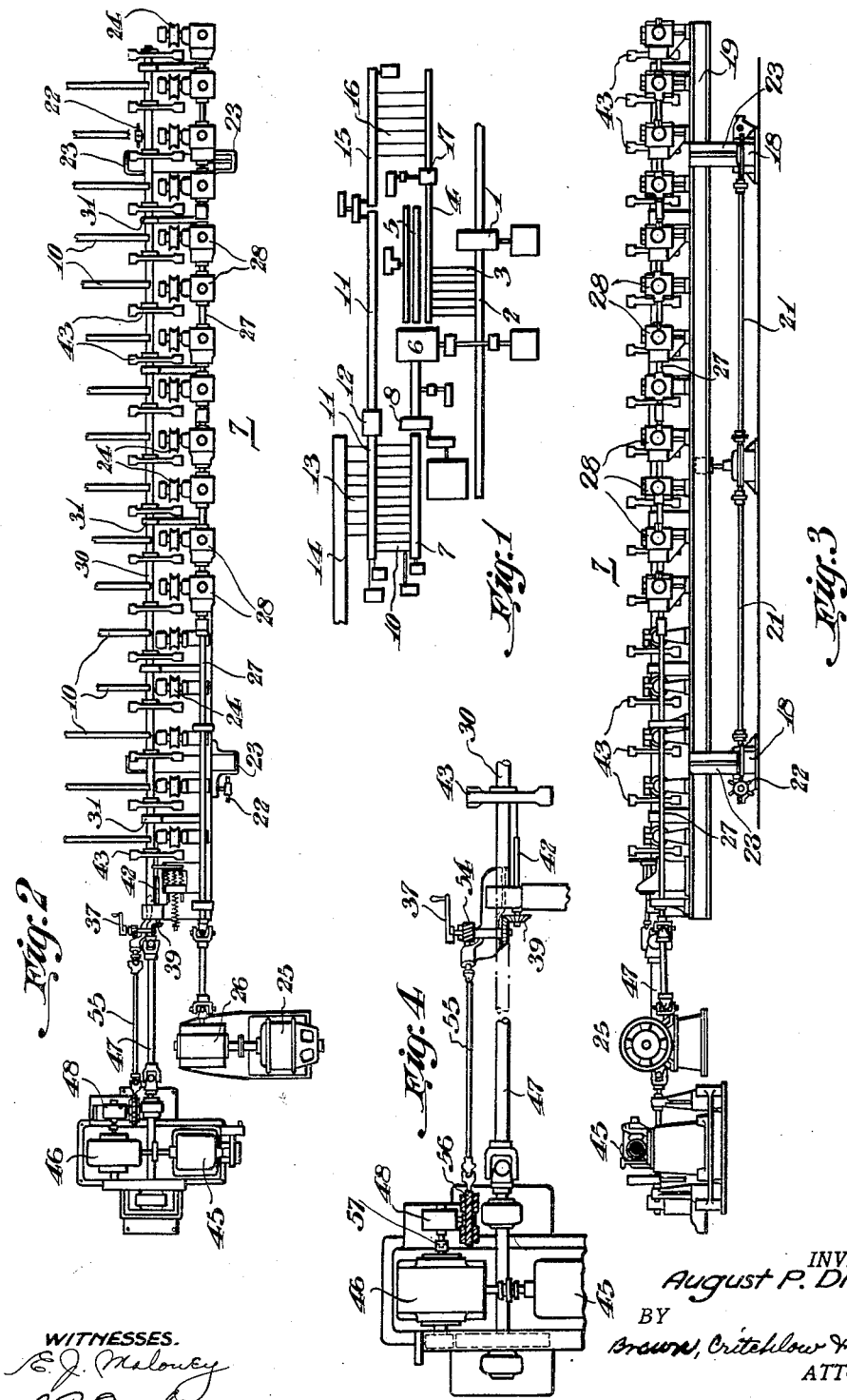

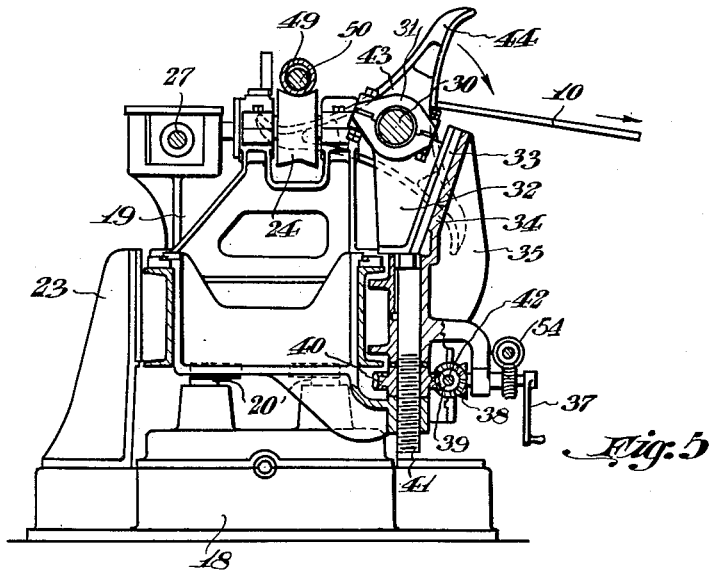

Patented June 26, 1934

1,964,508

UNITED STATES PATENT OFFICE 1,964,508

TUBE HANDLING APPARATUS

August P. Diescher, Pittsburgh, Pa., assignor to Diescher Tube Mills, Inc., Pittsburgh, Pa., a corporation of Delaware Application April 29, 1933, Serial No. 668,574

22 Claims. (Cl. 80—48)

My invention relates to tube handling apparatus, and particularly to apparatus that is employed in connection with the manufacture of seamless tubes.

In the manufacture of seamless tubes as by means of a cross-roll mill, the elongated tubes are usually received upon the grooved rollers of a delivery table by means of which they are conveyed to a suitable distance from the mill. The tubes may then be transferred laterally to inclined skids upon which each highly heated tube with a mandrel contained therein rolls to apparatus for removing the mandrel from the tube. The tube may then be removed to any desired location for cooling and storage or for further processing. Delivery tables of this character are usually adjustable in height in order that the table may be at the proper level to receive tubes of various diameters from the mill.

I have discovered that variations in the diameters of tubes, as well as variations in their temperatures and lengths, cause material differences in the speed at which they roll upon the inclined skids. For example, inclined skids that have an inclination that is sufficient to cause tubes of a diameter of 1½ inches to roll at such moderate and uniform speed that they will not be damaged upon engaging stationary members at the end of their travel, will cause a tube having a diameter, for example, of 4 inches to travel at such high rate of speed that the walls thereof may be damaged by reason of the impact against the stationary receiving devices at the end of their travel. I have found, also that in the employment of a delivery table for tubes of various diameters it is necessary to vary the inclination of the skids upon which the tubes roll through a greater range than is provided by the variations in height of the delivery table to accommodate tubes of various diameters.

In case the transfer mechanism for transferring the tubes from the grooved rollers of the delivery table to the inclined skids is of the type in which a horizontal shaft is provided with "throw-out" devices each consisting of a plurality of radial arms, it is necessary that the transfer mechanism be so positioned as to conform with the height of the ends of the skids to which the tubes are transferred in order that the transfer may be made without damage to the thin hot walls of the tubes.

I have found that if the higher or receiving ends of the skids are raised or lowered to adapt the inclination of the skids to the diameter of the tubes to be supported thereby, tubes of various diameters may be supplied thereto and will roll thereon at desired speeds. The delivery table must be raised or lowered to a relatively small degree to adapt it to receive tubes of different diameters but the ends of the skids must be moved to a greater degree to compensate for the variations in speeds produced by the variations in tube diameters.

In order that the hot tubes may be transferred from the delivery table to the inclined skids in such manner as not to damage the thin walls of the tubes, the transfer mechanism must also change its vertical position to conform with that of the upper ends of the skids. The transfer of the tubes to the skids may then be sufficiently gradual and the path of movement of each tube may be sufficiently nearly in alignment with the skids upon engagement therewith that the walls of the tube will not be damaged.

The relative positions of the ends of the skids and the transfer mechanism may be made to conform by a convenient arrangement in which the ends of the skids are supported upon the horizontal operating shaft of the transfer mechanism, whereby when the skids are raised or lowered by corresponding movements of the shaft the transfer mechanism is raised or lowered. The transfer mechanism is supported upon the delivery table and the bearings of the transfer mechanism may be raised or lowered with respect to the delivery table. These relative movements are less than would otherwise be necessary because the height of the delivery table must also be varied in accordance with the diameter of tubes to be received thereby.

By means of the arrangement described above, I am enabled to suitably adjust the height of the apparatus to receive hot tubes of various diameters and of comparatively thin walls from a mill for producing them, and to transfer these tubes to skids having such angles of inclination as will insure that the tubes roll thereupon at such moderate and approximately uniform speed that they may be safely conducted and deposited upon stationary receiving devices for such further operations or processing as may be desired.

The foregoing and other operating and constructional advantages will be apparent from a description of the accompanying drawings, in which Fig. 1 is a diagrammatic plan view of apparatus embodying my invention; Fig. 2 is a plan view of a delivery table and associated apparatus; Fig. 3 is an elevation of the apparatus of Fig. 2; Fig. 4 is a plan view in enlarged detail of the mechanism for adjusting the limit switch;

Fig. 5 is a view partially in end elevation and partially in vertical section of the delivery table of Fig. 2, certain of the adjustable parts being in their lower positions; Fig. 6 is a view similar to Fig. 5 with the adjustable parts in their upper positions; Fig. 7 is a view partially in elevation and partially in section of a portion of the delivery table and mechanism for transferring tubes therefrom, parts being broken away; and Fig. 8 is an end elevational view of a portion of the apparatus for returning mandrels to the mandrel feed table to be employed in the elongator.

Referring to Fig. 1, in which is diagrammatically illustrated apparatus for forming and handling seamless tubes, solid blanks are supplied to a piercing mill 1 which may be, for example, such as that shown and described in S. E. Diescher Patent No. 1,695,323, granted Dec. 18, 1928. The tubular blanks thus formed are received by an outlet table 2 from which they are transferred to skids 3 upon which they roll to a mandrel feed table 4. At this point the tubular blanks are provided with a mandrel and are transferred to a feed table 5 that is in alignment with the elongator 6.

The tubular blanks and mandrels therein pass through the elongator 6 which may be a cross-roll mill of the type shown and described in the patent to S. E. Diescher No. 1,870,209 granted August 2, 1932 from which mill the tubes thus formed are delivered to a delivery table 7 having at an intermediate portion thereof a gear stand 8, over which the tubes are conveyed.

The tubes and mandrels contained therein are transferred from the portion of the table 7 beyond the gear stand 8, which portion is illustrated in Figs. 2 and 3, by means of transfer mechanism, to be later described, to skids 10 upon which the tubes and mandrels roll to a table 11. The mandrels are then withdrawn from the tubes by means of a mandrel stripper 12 of usual form and the tubes are transferred to skids 13 and a conveying table 14 which conveys them to any suitable location for cooling or storage or further processing, as desired.

The mandrels are conveyed by the table 11 to a conveying table 15 from which they are transferred to the skids of a mandrel cooling and storage rack 16 which conduct the mandrels to a position adjacent the mandrel feed table 4 in readiness to be supplied to pierced billets or tubular blanks by means of pinch rolls 17.

In the operations described above a solid cylindrical billet has been formed into a seamless tube and the mandrel that has been employed during the passage of a tubular blank through the elongator has been withdrawn from the tube and recirculated to a position in which it may again be employed in the elongation of a succeeding tubular blank.

Referring particularly to Figs. 2, 3, 5 and 6, the delivery table 7, a portion of which is illustrated, comprises a plurality of base members 18 upon which is mounted a framework 19 that is vertically adjustable with respect to the base members 18 by means of jacks 20 that are connected for simultaneous adjustment by suitable mechanism comprising shafts 21 and hand-wheels 22 for actuating the shafts. Vertical guides 23 at the sides of the frame 19 prevent lateral movement of the frame as its vertical position is adjusted.

Mounted upon the frame 19 are a series of grooved rollers 24 for receiving tubes thereon and for conveying them longitudinally along the table. Certain of the rollers 24 at the left end of the table 7, Figs. 2 and 3, are freely rotatable while those at the right are driven by means of a motor 25, gear mechanism 26, a shaft 27, and a series of suitable mitre gear mechanisms 28 connected to each of the driven rollers 24.

A transfer mechanism that is mounted upon and supported by the framework of the delivery table 7 comprises a horizontal shaft 30 that is supported in a series of movable bearings 31. Each bearing 31 is mounted in a frame member 32 having an inclined flanged portion 33 that is mounted in inclined guide members 34 of a bracket 35 that is secured to one side of the frame 19.

The frame members 32 and the bearings 31 carried thereby are simultaneously movable in inclined paths along the inclined guides 34 to adjust the position of the horizontal shaft 30. The adjusting mechanism comprises a manually operable crank 37 and mitre gears 38 which drive a shaft 42 extending along the side of the delivery table 7.

At each bearing 31, the shaft 42 is provided with a worm 39 that drives a worm gear 40 having a screw-threaded engagement with a non-rotatable vertical shaft 41 the upper end of which engages the bottom portion of the frame members 32. Accordingly, the rotation of the crank 37 will cause all of the bearings 31 to be simultaneously raised or lowered to the same extent along the inclined guide members 34 by the operation of the crank 37 in the appropriate direction.

The shaft 30 has rigidly mounted thereon a series of transfer devices, or "throw-outs," 43, one adjacent each roller 24, these transfer devices are of somewhat triangular shape having three substantially radial arms 44 that are curved inwardly on one side thereof to enable them to lift tubes engaged thereby. The curved engaging portion of one side of each of the arms is as shown in continuation of the rear portion of an adjacent arm whereby these surfaces provide a continuous support for the tube thereon as the throw-outs 43 rotate in the direction in which the tube is to be transferred.

The details of the throw-out devices 43 constitute no part of the present invention, but constitute a portion of the subject matter of my co-pending application Serial Number 653,626, filed January 26, 1933.

As shown in Figs. 5, 6 and 7 the throw-outs 43 are in position to remove the tubes laterally from the grooved rollers 24 by engaging the under sides thereof and causing them to roll along the upper surfaces of the adjacent arms to deposit the tube and mandrel contained therein upon the skids 10. The throw-out devices 43 are driven by a motor 45, reduction gear mechanism 46, and suitable universal joint mechanism 47 that is connected to the shaft 30. The throw-out devices 43 are operated intermittently through one-third of a revolution, this angular movement being all that is necessary to transfer a tube from the grooves of the rollers 24 to the skids 10.

A limit switch 48 that is located adjacent the driving motor 45, may be of any suitable type, such for example as a cam operated limit switch which is geared to the shaft 30 at a 3:1 ratio whereby it stops the motor 45 when the throw-out devices have operated through one-third of a revolution.

It may be assumed that the table 7 and the associated parts including the transfer mechanism and the skids 10 occupy the several positions in which they are illustrated in Fig. 5, which arrangement is that adapted for receiving tubes of relatively large diameter. It will be noted that the jacks 20 of the table 7 have been adjusted to lower the table with its grooved rollers 24 to such position as to accommodate the large diameter of tubes to be received thereupon.

The shaft 30 and the transfer mechanism supported thereby and the ends of the skids 10 occupy their lowest positions relative to the table 7 in which the shaft 30 and the throw-out devices have horizontal positions that are relatively close to the frame-work of the table 7. It will be noted also that the axis of the shaft 30 is materially below the upper surfaces of the grooved rollers 24, and that the ends of the skids 10, which are supported upon the shaft 30, are correspondingly lowered.

When tubes of relatively large diameter, such as tube 49 with a mandrel 50 therein, are received upon the rollers 24, the transfer mechanism, including the shaft 30 and the throw-outs 43, operate automatically, as by means of a usual flag switch, not shown, when each tube 49 reaches a predetermined point in its longitudinal travel to lift the tube from the rollers 24 and to permit it to roll upon the surfaces of the throw-outs until it is transferred to the skids 10 for rolling movement thereon. The inclination of the skids 10 is such that the tubes 49 of large diameter roll thereon with such moderate and uniform speed that they may be stopped at the end of their travel without damage to the relatively thin hot walls thereof when they are engaged by the receiving devices. The lower ends of the skids rest against suitable abutments, such as shown in Fig. 7, to prevent endwise outward movement of the skids such as might otherwise be caused by the rotation of the shaft 30 upon which the upper ends are supported.

It may be assumed that the elongator has now been arranged for the production of tubes of relatively small diameter whereupon it is necessary that the table 7 and the associated transfer mechanism and skids 10 be adapted for the operating conditions that are essential to the handling of tubes of small diameter. The frame 19 and the rollers 24 carried thereby are adjusted to their upper positions, as shown in Fig. 6, by proper adjustment of the jacks 20. In order to make the range of adjustment of the apparatus more clearly apparent, the adjustment of the various parts from their respective positions in Fig. 5 have been considerably exaggerated in proportion to the variation in tube diameters. It is also necessary to adjust the skids 10 for greater inclination in view of the fact that small tubes do not roll as easily as tubes of large diameter.

While the shaft 30 and skids 10 have been raised with the frame 19 of the table 7 this adjustment is not sufficient for the purposes referred to above, and accordingly the crank 37 and the associated mechanism are operated to raise the shaft 30 along the path of the inclined guides 34 to simultaneously vary the horizontal position of the shaft 30 and the throw-out members 43 and to raise them to positions, such, for example, as those in which they are illustrated in Fig. 6, and also to raise the skids.

The increase in the horizontal spacing of the rollers 24 and the shaft 30 provides that the curved portions of the radial arms 44 engage the tubes 51 of relatively small diameter at suitable portions thereof in order to insure that their initial movements will be in the proper direction. The higher position of the shaft 30 increases the inclination of the skids 10 in order to insure that the tubes and contained mandrels 52 will move with proper speed from the table when they are transferred to the skids.

It will be noted by comparison of the positions of the throw-out devices 43 in Figs. 5 and 6 that they occupy different angular positions when their relative vertical positions have been changed. This change in stationary position is necessary in order that each arm 44 that is in position to engage a tube will not be in the path of the tube that is to be received by the delivery table such as might be the case if the stationary angular positions of the arms were not changed. This change in stationary angular position of the throw-out devices occurs automatically by means of mechanism shown in Fig. 2 and in enlarged detail in Fig. 4.

The shaft of the crank 37 and the gears 38 is connected by means of gears 54 and suitable universal couplings 55 to a gear 56 that is in turn adapted by means of suitable gear mechanism, not shown, to adjust the angular position of a stationary portion of the limit switch 48, relative to its operating shaft 57. These connections are so designed as to adjust the limit switch 48 proportionally to the raising or lowering of the transfer mechanism whereby the stationary angular positions of the arms 44 are suitably varied in accordance with the vertical position of the shaft 30. The limit switch 48 may be adjusted manually, if desired, by disconnecting it from the crank 37. When the crank 37 is turned to raise or lower shaft 30 and the skids 10 thereon, the gears 54, couplings 55 and connected mechanism operate to adjust the position of limit switch 48 to correspondingly vary the stationary positions of the arms 44 of transfer devices 43.

While the operations of the mechanism of Figs. 5 and 6 were described in connection with the production of tubes of relatively large diameter and relatively small diameter, respectively, it will be appreciated that for the production and handling of tubes of intermediate diameters the positions of the various parts including the frame 19, the grooved rollers 24, the transfer mechanism including the shaft 30, and the throw-out devices 43, together with the skids 10, will occupy suitable intermediate positions in order that the various parts of the apparatus may perform their appropriate functions in suitable manner.

Reference may now be had to Fig. 7 in which is illustrated a portion of the mechanism for transferring tubes from the delivery table 7 to the table 11 referred to in connection with Fig. 1. The several parts of the transfer mechanism are shown in positions for handling tubes of intermediate diameters.

When the parts are in their lower positions corresponding to the arrangement of Fig. 5 as indicated by dotted lines, the inclination of the skids 10 is that adapted for tubes of the largest diameter to be handled by the apparatus.

When the transfer mechanism and the associated apparatus are in positions corresponding to the uppermost position of the skids 10, as indicated by dot-and-dash lines, the inclination of the skids is the greatest, such as is required for the tubes of smallest diameter.

It will be noted that tubes are received at the lower ends of the skids 10 upon relatively flat members 58 upon which they roll to grooved rollers 59 of the table 11. A stop 60 beyond each of the rollers 59 insures that the tubes will not travel beyond these rollers.

Similar transfer mechanism may be employed for transferring tubes from the table 11, after the mandrels have been extracted therefrom, one of the throw-out devices 43 being shown. The shaft 30 for supporting the throw-out devices 43 may be adjustable in the same manner and by mechanisms similar to that described in connection with the transfer mechanism for the delivery table 7.

A portion of the mechanism for returning mandrels from the conveying table 15 to the mandrel rack 16 is illustrated in Fig. 8. A suitable transfer mechanism comprising throw-out devices 43 transfers the mandrels as described above in connection with tubes to the skids or bars of the cooling rack 16 upon which they roll to a position adjacent to the mandrel feed table 4 to be inserted into a tubular blank by pinch rolls 17 as described above. The mandrels, for example mandrels 50, upon reaching the lower end of the skids of rack 16 rest against stationary curved stops 62 over which they may be raised by arms 63 mounted upon a rock shaft 64 that is actuated by a crank 65 and a link 66 connected to any suitable actuating device to supply mandrels to the rollers 67 of the mandrel feed table 4.

It will be noted from the foregoing that I have provided an arrangement whereby a delivery table and its associated mechanism, including transfer mechanism and skids for conducting tubes and mandrels therefrom, may be adapted for use in connection with tubes of diameters that vary materially. The various parts occupy different relative positions to adapt them for suitable operation in connection with the tubes of various sizes. The stationary angular positions of the transfer devices are varied in accordance with the sizes of the tubes to be handled thereby and in accordance with the positions of these devices relative to the delivery table.

The adjustment relative to the delivery table of the height of the transfer mechanism and the skids upon which the tubes roll is made easily and conveniently by a single movable member and the inclined guideways upon which the transfer shaft is moved insures that the transfer mechanism adjusts its vertical and its horizontal position simultaneously in accordance with desired operating conditions.

The foregoing and other advantages will be apparent to those skilled in the art of constructing and operating tube handling apparatus.

The term "table" as employed in the claims is intended to include any suitable means for receiving tubes for transfer therefrom.

I claim:

1. Tube handling apparatus comprising a table for receiving tubes thereon, inclined skids for supporting rolling tubes thereon and having their higher ends supported upon and vertically movable with said table, means for varying the height of said table to adapt it for receiving tubes of various diameters, and means for varying the relative heights of said table and the higher ends of the skids to control the speed of rolling movement of tubes thereon.

2. Tube handling apparatus comprising a table, inclined skids supported at their upper ends adjacent said table, mechanism for transferring tubes from said table to said skids for rolling movement on the latter, means for simultaneously varying the height of said table, said skids and said transfer mechanism, and means for varying the height of said transfer mechanism relative to said table.

3. Tube handling apparatus comprising a table, inclined skids supported at their upper ends adjacent said table, mechanism for transferring tubes from said table to said skids for rolling movement on the latter, means for simultaneously varying the height of said table, said skids and said transfer mechanism, and means for varying the height of said skids relative to said table.

4. Tube handling apparatus comprising a table, inclined skids supported at their upper ends adjacent said table, mechanism for transferring tubes from said table to said skids for rolling movement on the latter, means for simultaneously varying the height of said table, said skids and said transfer mechanism, and means for varying the height of said transfer mechanism and said skids relative to said table.

5. Tube handling apparatus comprising a table, transfer mechanism supported by said table, inclined skids supported by said transfer mechanism for receiving tubes thereon, means for raising and lowering said table and the transfer mechanism and skids supported thereby, and means for varying the height of said transfer mechanism and said skids relative to that of said table.

6. Tube handling apparatus comprising a table for receiving tubes thereon, means for adjusting the height of said table to adapt it to receive tubes of various diameters, inclined members extending from said table, mechanism for transferring tubes from said table to said inclined members, and means for varying the inclination of said members to control the speed of movement of tubes thereon and for varying the height of said mechanism to conform with the position of the inclined members.

7. Tube handling apparatus comprising a table, transfer mechanism comprising a rotatable shaft supported by said table and having devices thereon for actuating tubes laterally, skids supported at one end upon said shaft for receiving tubes from said table, and means for varying the height of said shaft relative to said table for varying the inclination of said skids and thereby varying the rate of travel of tubes thereon.

8. Tube handling apparatus comprising a table, transfer mechanism comprising a rotatable shaft supported by said table and having devices thereon for actuating tubes laterally, skids supported at one end upon said shaft for receiving tubes from said table, means for varying the height of said shaft relative to said table for varying the inclination of said skids and thereby varying the rate of travel of tubes thereon, and means for varying the height of said table to adapt it to receive tubes of various diameters.

9. Tube handling apparatus comprising a table for receiving tubes thereon, transfer mechanism for removing tubes laterally from said table, said transfer mechanism comprising a horizontal shaft having a plurality of bearings supported by said table and having a plurality of devices thereon for engaging and actuating said tubes, and means for simultaneously varying the vertical positions of said bearings relative to said table to vary the axial position of said shaft.

10. Tube handling apparatus comprising a table for receiving tubes thereon, transfer mechanism for removing tubes laterally from said table, said transfer mechanism comprising a horizontal shaft having a plurality of bearings supported by said table and having a plurality of devices thereon for engaging and actuating said tubes, inclined skids having one end thereof supported upon said shaft, and means for varying the vertical positions of all of said bearings simultaneously for varying the inclination of said skids.

11. Tube handling apparatus comprising a table, transfer mechanism the height of which relative to said table is variable, said transfer mechanism comprising lifting devices having a plurality of rotatable arms that are intermittently movable between stationary positions, and means for varying the stationary angular positions of said arms in order that they may correspond with the relative vertical positions of said table and said transfer mechanism.

12. Tube handling apparatus comprising a table, transfer mechanism the height of which relative to said table is variable, said transfer mechanism comprising lifting devices having a plurality of rotatable arms that are intermittently movable between stationary positions, and means for varying the stationary angular positions of said arms in accordance with the relative vertical positions of said table and said transfer mechanism, said means comprising a limit switch, and means for varying the operative position of said switch.

13. Tube handling apparatus comprising a table, transfer devices, mechanism for varying the relative heights of said table and said transfer devices, said transfer devices comprising a plurality of rotatable arms that are intermittently movable between stationary positions, and means connected to said mechanism for varying the stationary angular positions of said arms.

14. Tube handling apparatus comprising a table, transfer devices, mechanism for varying the relative heights of said table and said transfer devices, said transfer devices comprising a plurality of rotatable arms that are intermittently movable between stationary positions, and means operated automatically by said mechanism for varying the stationary angular positions of said arms in accordance with the relative heights of said table and said transfer devices.

15. Tube handling apparatus comprising a table, transfer devices, mechanism for varying the relative heights of said table and said transfer devices, said transfer devices comprising a plurality of rotatable arms that are intermittently movable between stationary positions, and means comprising a limit switch having an adjustable portion actuated by said mechanism for varying the stationary angular positions of said arms in accordance with the relative heights of said table and said transfer devices.

16. Tube handling apparatus comprising a table for receiving tubes thereon, transfer mechanism for removing tubes laterally from said table, said transfer mechanism comprising a series of rotatable devices having radial arms for engaging said tubes, and means for varying the horizontal positions of said devices relative to said table to adapt them for engaging tubes of various diameters.

17. Tube handling apparatus comprising a table for receiving tubes thereon, transfer mechanism for removing tubes laterally from said table, said transfer mechanism comprising a series of rotatable devices having radial arms for engaging said tubes, and means for simultaneously varying the horizontal and the vertical positions of said devices relative to said table.

18. Tube handling apparatus comprising a table for receiving tubes thereon, transfer mechanism for removing tubes laterally from said table, said transfer mechanism comprising a series of rotatable devices having radial arms for engaging said tubes, means for simultaneously varying the horizontal and the vertical positions of said devices relative to said table, said means comprising inclined members connected to said devices and said table and means for actuating said members.

19. Tube handling apparatus comprising a table for receiving tubes thereon, transfer mechanism for removing tubes laterally from said table, said transfer mechanism comprising a series of rotatable devices having radial arms for engaging said tubes, means for varying the horizontal positions of said devices relative to said table to adapt them for engaging tubes of various diameters, said means comprising members forming inclined guideways for permitting relative movement between said table and said devices.

20. Tube handling apparatus comprising means for receiving tubes of various diameters, transfer mechanism for removing said tubes laterally from said receiving means, said transfer mechanism comprising a horizontal shaft mounted in bearings supported on said receiving means by inclined guide members and devices on said shaft having radial arms for engaging and actuating said tubes, and means for moving said bearings along said inclined guide members to simultaneously vary the relative horizontal and vertical positions of said devices and said receiving means to adapt said devices for tubes of various diameters.

21. Tube handling apparatus comprising a table for receiving tubes thereon, transfer mechanism supported by said table and vertically movable with respect thereto, said transfer mechanism comprising lifting devices having a plurality of rotatable arms that are intermittently movable between stationary positions, means comprising a limit switch for controlling the stationary angular positions of said arms, means comprising a single member for varying the vertical position of said transfer mechanism relative to said table, and means for connecting the last-named means to an adjustable portion of said limit switch for varying the stationary angular positions of said arms simultaneously with the change in vertical position of said transfer mechanism relative to said table.

22. Tube handling apparatus comprising a table, transfer mechanism the height of which relative to said table is variable, said transfer mechanism comprising lifting devices having a plurality of rotatable arms that are intermittently movable between stationary positions, an electric switch for bringing said lifting devices to rest in their successive stationary positions, and means controlled automatically according to the relative movement between the table and the transfer mechanism for varying the operative position of said switch.

AUGUST P. DIESCHER.